(12) United States Patent
Das et al.

(10) Patent No.: US 9,164,479 B2
(45) Date of Patent: Oct. 20, 2015

(54) SYSTEMS AND METHODS OF DUAL-PLANE DIGITAL HOLOGRAPHIC MICROSCOPY

(75) Inventors: Bhargab Das, Dorchester, MA (US); Chandra S. Yelleswarapu, Arington, MA (US); Devulapalli V. G. L. N. Rao, Lexington, MA (US)

(73) Assignee: UNIVERSITY OF MASSACHUSETTS, Boston, MA (US)

( * ) Notice: Subject to any disclaimer, the term of this patent is extended or adjusted under 35 U.S.C. 154(b) by 356 days.

(21) Appl. No.: 13/234,485

(22) Filed: Sep. 16, 2011

(65) Prior Publication Data

US 2013/0070251 A1   Mar. 21, 2013

(51) Int. Cl.
| | |
|---|---|
| G01B 9/021 | (2006.01) |
| G03H 1/00 | (2006.01) |
| G02B 21/36 | (2006.01) |
| G02B 26/06 | (2006.01) |
| G03H 1/08 | (2006.01) |
| G03H 1/04 | (2006.01) |

(52) U.S. Cl.
CPC .......... *G03H 1/0005* (2013.01); *G02B 21/365* (2013.01); *G02B 26/06* (2013.01); *G03H 1/0443* (2013.01); *G03H 1/0866* (2013.01); *G03H 2001/005* (2013.01); *G03H 2001/0447* (2013.01); *G03H 2001/0454* (2013.01); *G03H 2001/0471* (2013.01); *G03H 2210/10* (2013.01); *G03H 2210/12* (2013.01); *G03H 2223/13* (2013.01); *G03H 2223/52* (2013.01); *G03H 2223/55* (2013.01); *G03H 2226/13* (2013.01)

(58) Field of Classification Search
CPC .. G01B 9/02047; G01B 9/021; G03H 1/0443; G03H 1/0406
USPC ................................................. 356/457, 521
See application file for complete search history.

(56) References Cited

U.S. PATENT DOCUMENTS

| | | | |
|---|---|---|---|
| 7,659,968 B2 | 2/2010 | Wang et al. | |
| 7,738,047 B2 * | 6/2010 | Yelleswarapu et al. | 349/1 |
| 7,880,820 B2 | 2/2011 | Yelleswarapu et al. | |
| 7,978,336 B2 * | 7/2011 | Mann et al. | 356/485 |
| 2005/0046858 A1 * | 3/2005 | Hanson et al. | 356/457 |
| 2010/0231896 A1 * | 9/2010 | Mann et al. | 356/73 |

OTHER PUBLICATIONS

Antkowiak, M. et al., "Quantitative phase study of the dynamic cellular response in femtosecond laser photoporation," Biomed. Opt. Express vol. 1(2) ,414-424 (2010).

(Continued)

*Primary Examiner* — Jonathan Hansen
(74) *Attorney, Agent, or Firm* — Lando & Anastasi, LLP

(57) ABSTRACT

An embodiment of the disclosed DHM system includes a light source configured to emit coherent optical waves, a first optical Fourier element configured to Fourier transform the optical waves from the object area, wherein the Fourier transform occurs at a Fourier plane and the optical waves from the object area includes directly transmitted waves and diffracted waves, a phase modulator at the Fourier plane configured to introduce a phase delay between the directly transmitted waves and the diffracted waves, a second optical Fourier element configured to receive the directly transmitted waves and the diffracted waves from the phase modulator and to inversely Fourier transform the directly transmitted waves and the diffracted waves to provide interfered optical waves, and at least one imaging device configured to record the interfered optical waves at two image planes to generate a first interferogram and a second interferogram.

23 Claims, 12 Drawing Sheets

(56) References Cited

OTHER PUBLICATIONS

Barty, A. et al., "Quantitative optical phase microscopy," Opt. Lett. vol. 23(11) 817-819 (1995).
Bernet, S. et al., "Quantitative imaging of complex samples by spiral phase contrast microscopy," Opt. Express 14,3792-3805 (2006).
Brophy, C.P. "Effect of intensity error correlation on the computed phase of the phase-shifting interferometry," J. Opt. Soc. Am. A 7, 537-541 (1990).
Charriere, F. et al., "Cell refractive index tomography by digital holographic microscopy," Opt. Lett. 31, 178-180 (2006).
Cuche, E. et al., "Simultaneous amplitude-contrast and quantitative phasecontrast microscopy by numerical reconstruction of Fresnel off-axis holograms," Appl. Opt. 38, 6994-7001 (1999).
Gao, P. et al., "Phase-shifting point-diffraction interferometry with common-path and inline congigiration for microscopy", Opt. Lett. vol. 35(5): 712-714 (2010).
Garcia-Sucerquia, J. et al., "Digital in-line holographic microscopy," Appl. Opt. vol. 45 (5): 836-850 (2006).
Guo, C.S. et al., "Phase-shifting error and its elimination in phaseshifting digital holography," Opt. Lett., vol. 27(19): 1687-1689 (2002).
J. W. Goodman, Introduction to Fourier Optics, 3rd ed., pp. 46-50 (Roberts & Company, 2004).
Kadono, H. et al., "Phase shifting Common path interferometer using a Liquid Crystal Phase modulator" Opt.Comm. vol. 119: 291-400 (1994).
Khmaladze, A. et al., "Phase imaging of cells by simultaneous dual-wavelength reflection digitial holography," Opt. Express vol. 16(15: 16, 10900-10911 (2008).
Kim, M.K., "Principles and techniques of digital holographic microscopy," SPIE Reviews 1, (50 pages) (2010).
Lue, N. et al., "Quantitative phase imaging of live cells using fast Fourier phase microscopy," Appl.Opt. 46, 1836-1842 (2007).
Malacara, Optical Shop testing (Wiley-Interscience, A John Wiley & Sons, Inc., pp. 97-121 (2007).
Marquet, P. et al., "Digital holographic microscopy: A noninvasive contrast imaging technique allowing quantitative visualization of living cells with subwavelength axial accuracy," Opt. Lett. 30,468-470 (2005).
Nelleri, A. et al., "Phase reconstruction in lensless digital in-line holographic microscopy," Opt. Lasers Eng. vol. 48, 27-31 (2010).
Oh, C. et al., "On-chip differential interference contrast microscopy using lensless digital holography," Opt. Express 18,4717-4726 (2010).
Pavani, S.R.P., et al., "Quantitative structured-illumination phase microscopy," Appl. Opt. 47, 15-24 (2008).
Popescu, G. et al., "Fourier phase microscopy for investigation of biological strctures and dynamics," Opt. Lett. 29, 2503-2505 (2004).
Prodi, F. et al., "Digital holography for observing aerosol particles undergoing Brownian motion in microgravity conditions," Atmospheric Research 82, 379-384 (2006).
Rappaz, B. et al., "Measurement of the integral refractive index and dynamic cell morphometry of living cells with digital holographic microscopy," Opt. Express 13,9361-9373 (2005).
Rappaz, B. et al., "Spatial analysis of erythrocyte membrane fluctuations by digital holographic microscopy," Blood Cells, Molecules, and Diseases, vol. 42 (5 pages) (2009).
Schwider, J. et al., "Digital wavefront measuring intergerometry: some systematic error sources," Appl. Opt. 22, 3421-3432 (J 983).
Shaked, N.T., et al., "Dual-interference-channel quantitative-phase microscopy of live cell dynamics," Opt. Lett. vol. 34(6): 767-769 (2009).
Shaked N.T. et al., "Two-step-only phase-shifting interferometry with optimized detector bandwidth for microscopy of live cells," Opt. Express 17, 15585-15591 (2009).
Situ, G. et al., "Generalized in-line digital holographic technique based on intensity measurements at two different planes," Appl. Opt. 47, 711-717 (2008).
Smith, F.H. "Microscopic Interferometry," Research (London) 8, (13 pages) (1955).
Yamaguchi, I. et al., "Image formation in phase-shifting digital holography and applications to microscopy," Appl. Opt. 40, 6177-6186 (2001).
Yu, L. et al., "Digital holographic microscopy for quantitative cell dynamics evaluation during laser microsurgery," Opt. Express. 17, 12031-12038 (2009).
Zernike, F. "How I discovered phase contrast," Science 121,345-349 (1955).
Zhang, Y. et al., "Reconstruction of in-line digital holograms from two intensity measurements," Opt. Lett. 29, 1787-1789 (2004).
Das, B. and Yelleswarapu, C. "Dual plane in-line digital holographic microscopy," Optics Letters, vol. 35(20) 3426-3428 (2010).
Das et al. "Dual Plane In-Line Digital Holographic Microscopy". Optics Letters, vol. 35 No. 20. Oct. 15, 2010.
Zhang et al. "Reconstruction of In-Line Digitial Holograms from Two Intensity Measurements". Optics Letters, vol. 29 No. 15. Aug. 1, 2004.

* cited by examiner

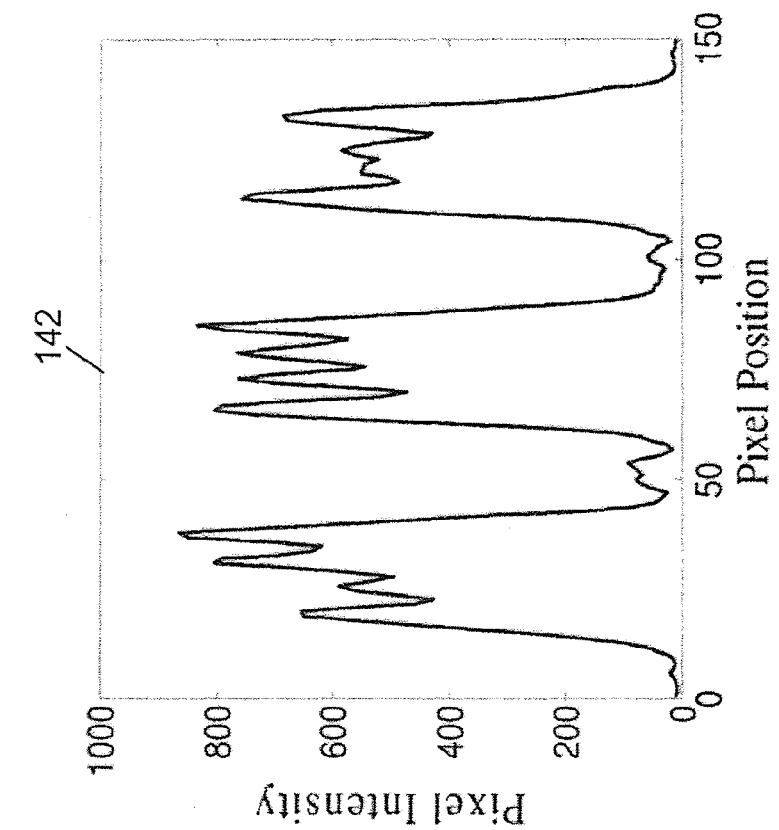
FIG. 5-B
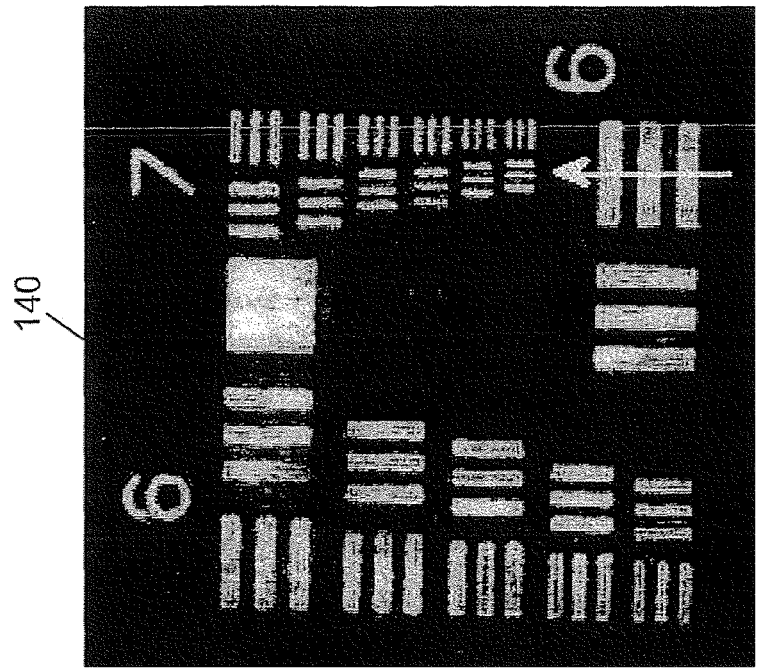
FIG. 5-A

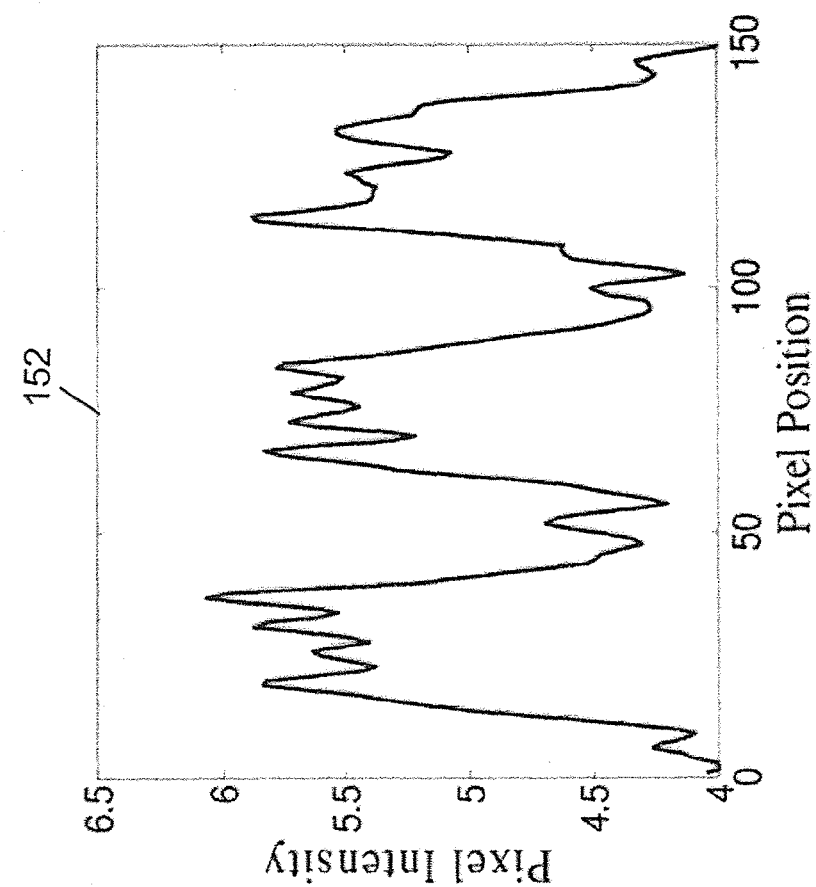
FIG. 6-B
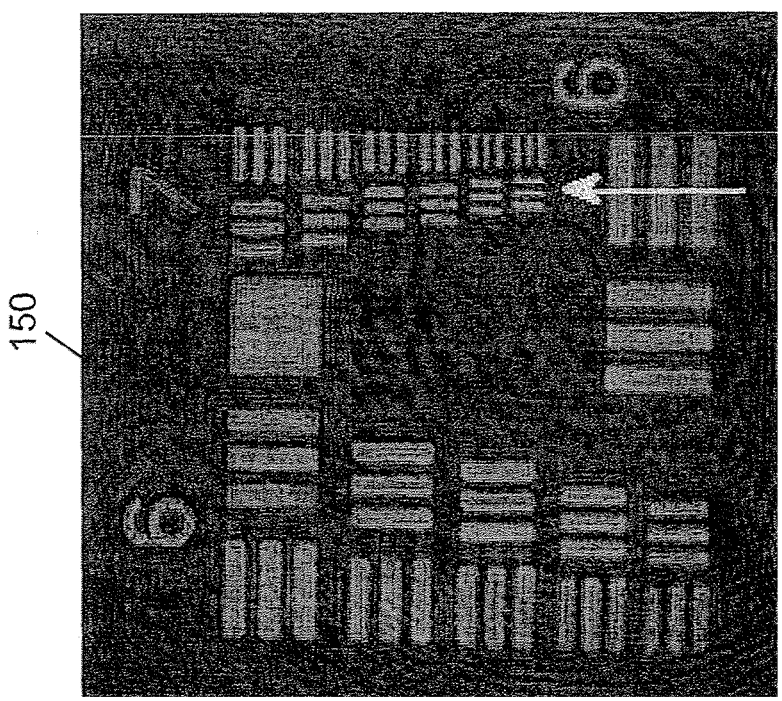
FIG. 6-A

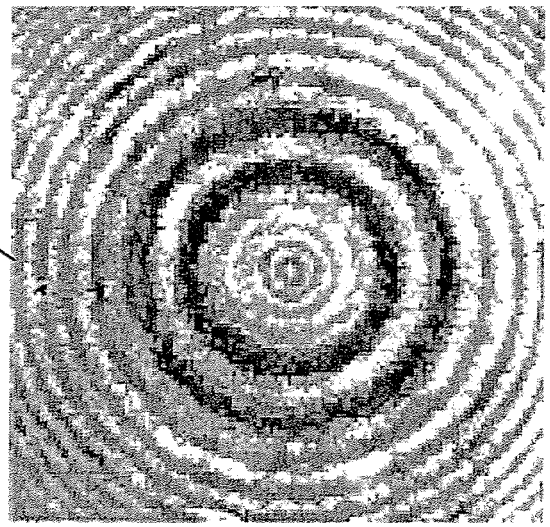
FIG. 8B
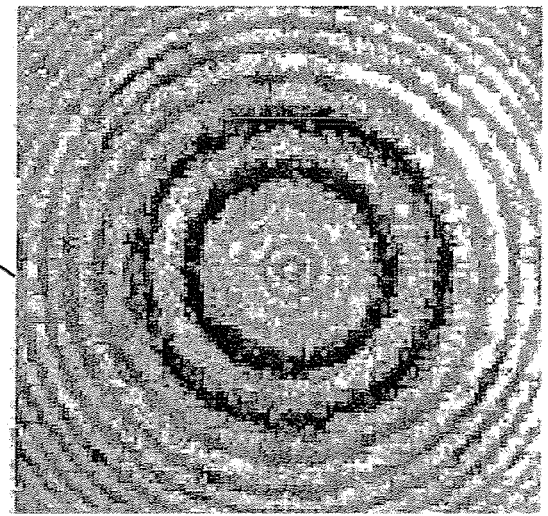
FIG. 8A

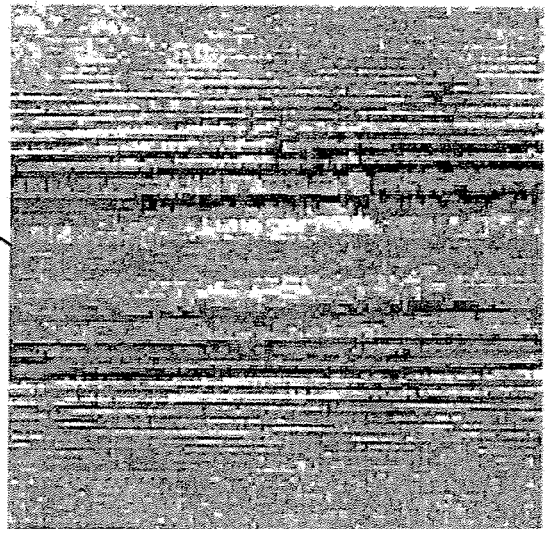
FIG. 10B
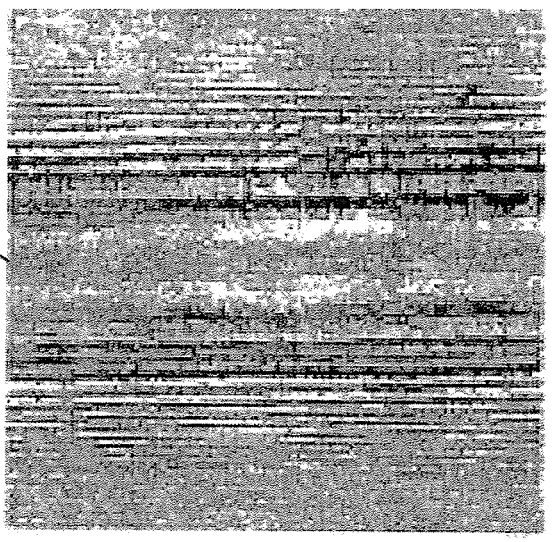
FIG. 10A

SYSTEMS AND METHODS OF DUAL-PLANE DIGITAL HOLOGRAPHIC MICROSCOPY

STATEMENT REGARDING FEDERALLY SPONSORED RESEARCH OR DEVELOPMENT

This invention was made with government support under 1R21RR024429-01A1 awarded by National Institute of Health. The government has certain rights in the invention.

CROSS REFERENCE TO RELATED APPLICATIONS

This application is related to U.S. Pat. No. 7,738,047 and U.S. Pat. No. 7,880,820, entitled "Systems and Methods of All-Optical Fourier Phase Contrast Imaging using Dye Doped Liquid Crystals," the entire contents of which are incorporated herein by reference.

BACKGROUND

1. Field

The disclosed subject matter generally relates to digital holographic microscopy.

2. Discussion of Related Art

Numerous biological samples, including live cells, are generally transparent under visible-light illumination and behave essentially as phase objects. Phase objects can only alter the phase component of optical waves, not their amplitude component. Hence, the phase structure of these objects are difficult to see with naked eyes or ordinary imaging techniques, which are only sensitive to the amplitude component of optical waves.

Phase imaging techniques can record phase structure of objects. For example, techniques such as Zernike's phase contrast (PC) method and Nomarski's differential interference contrast (DIC) method can visualize the phase component of optical waves by transforming the phase information into amplitude contrast. However the phase information provided by these techniques is only qualitative. As such, these techniques cannot be used to measure certain biological parameters of specimens, such as intracellular refractive indices, because measuring such biological parameters requires measuring phase structure of the biological specimen quantitatively.

These issues can be addressed using digital holographic microscopy (DHM). DHM is a non-destructive, full-field, label-free method of measuring the amplitude structure and the quantitative phase structure of microscopic specimens. In DHM, optical components are configured in such a way that a portion of coherent optical waves passes through a microscopic specimen, whereas the rest of the coherent optical waves propagates unhindered. The optical waves propagating through the specimens are called object waves, sometimes also called object beams, and the unhindered optical waves are called reference waves, sometimes also called reference beams. The structure of the microscopic specimen introduces amplitude attenuations and phase delays to the object waves with respect to the reference waves. In other words, the structure of the microscopic specimen is encoded in the object waves.

The information encoded in the object waves can be recovered by interfering the object waves with the reference waves and post processing. The reference waves and the object waves are interfered, and the interfered optical waves are recorded using an imaging device. The recorded interference pattern, also called an interferogram, is subsequently processed to reconstruct the amplitude and phase structure of the microscopic specimen.

In DHM, the reference waves and the object waves are interfered using one of the two general techniques: off-axis interferometry and on-axis interferometry. Off-axis interferometry interferes waves propagating along two different axes and records the resulting interferogram using a single camera exposure. The use of a single camera exposure renders this technique especially suited to imaging dynamic processes, such as cell growths, cell membrane fluctuations, cell swelling, neuronal activity, and cytoskeletal dynamics. Unfortunately, off-axis interferometry requires a spatial filtering during numerical reconstruction that separates the desired positive-order diffracted waves, and the unwanted zero- and negative-order diffracted waves. This spatial filtering process limits the spatial resolution of the reconstructed image.

In on-axis interferometry, on the other hand, the reference waves and the object waves propagate along the same axis, which allows for restoring the specimen information without using a resolution-limited spatial filter. However, on-axis interferometry requires recording at least three phase-shifted interferograms. Since a relatively long time is required for applying the phase shifts and acquiring the interferograms, this method of phase-shifting is not suitable for recording dynamic processes. In addition, on-axis phase-shifting interferometry is also prone to phase-shift calibration errors, and system fluctuations that may occur while capturing multiple interferograms.

Some of these issues are partly addressed in Zhang et al., entitled "Reconstruction of in-line digital holograms from two intensity measurements." Zhang shows an optical system that records two interferograms of an amplitude object (i.e., an object that attenuates only the amplitude of illuminated optical waves) and processes the two interferograms to recover an image of the amplitude object.

However, Zhang's optical system is tailored to reconstructing amplitude objects only and is incapable of reconstructing phase objects. Zhang et al. assume that the intensity of the object waves is significantly weaker than that of the reference waves. While this assumption might hold for objects with low transmission coefficients such as amplitude objects, this assumption does not hold for objects with high transmission coefficients such as phase objects. Therefore, Zhang's optical system is incapable of imaging object with both amplitude and phase structures.

FIG. 4 experimentally shows that Zhang's system fails to recover the phase structure of phase objects, and FIG. 6 experimentally shows that Zhang's system also does a poor job in recovering the amplitude structure of amplitude objects due to the impractical weak-object wave assumption. Therefore, Zhang's optical system cannot accurately recover either the amplitude structure or the phase structure of specimens. Thus, it is desirable to develop an in-line DHM technique that is capable of capturing amplitude and phase structures of microscopic objects while maintaining a short exposure time, a high spatial resolution, and a high contrast.

SUMMARY

Certain embodiments disclose a digital holographic microscopy system that includes a light source configured to emit coherent optical waves, an object area configured to accommodate a specimen, a first optical Fourier element configured to Fourier transform the coherent optical waves from the object area that include directly transmitted waves and diffracted waves, a phase modulator configured to introduce a phase delay between the directly transmitted waves and the diffracted waves, a second optical Fourier element configured to receive the directly transmitted waves and the diffracted waves from the phase modulator and to inversely Fourier transform the directly transmitted waves and the diffracted waves, thereby providing interfered optical waves, and at least one imaging device configured to record the interfered optical waves at first and second recording planes to generate a first interferogram and a second interferogram.

BRIEF DESCRIPTION OF DRAWINGS

FIGS. 5A-5B show an image and a profile of a portion of the USAF resolution chart reconstructed using an embodiment of ID-DHM shown in FIG. 1;

FIGS. 6A-6B show an image and a profile of a portion of the USAF resolution chart reconstructed using Zhang's optical system;

FIGS. 8A-8B illustrate two interferograms of polystyrene beads recorded using an embodiment of CID-DHM shown in FIG. 7;

FIGS. 10A-10B illustrate two interferograms of fibers recorded using an embodiment of CID-DHM shown in FIG. 7;

DETAILED DESCRIPTION

Embodiments of the present invention are directed to systems and methods of an in-line digital holographic microscopy (DHM) that is configured to record a plurality of interferograms associated with microscopic specimens and to recover from the plurality of inteferograms the amplitude information and the phase information of the microscopic specimens. Because the plurality of interferograms can be recorded substantially simultaneously, embodiments of the present invention can record fast dynamic processes such as cell membrane fluctuations, cell swelling, neuronal activity, and cytoskeletal dynamics.

In-Line Dual-Plane DHM (ID-DHM)

Generally, in-line DHM uses a coherent light source to illuminate a specimen that is located in an optical path between the light source and an image plane. In-line DHM is configured to illuminate the specimen along the axis normal to the image plane; the optical waves passing through the specimen are called the object waves. In-line DHM is also configured to use the same coherent light source to generate optical waves that do not pass through the specimen. As discussed in the background section, these optical waves are called the reference waves.

The object waves are interfered with reference waves, and the resulting interference pattern is recorded at the image plane using an imaging device (i.e., optical detector array such as CCD or CMOS sensor array). The recorded interference pattern is also called an interferogram. The interferogram includes three image components: (1) a reference image formed from the reference waves, also called a zero-order diffraction image, (2) a specimen image of the illuminated specimen formed from the object waves, and (3) a conjugate specimen image of the illuminated specimen formed from the complex conjugate of the object waves.

The goal of in-line DHM is to recover the specimen image from interferograms. To recover the specimen image of the illuminated specimen from the interferograms, in-line DHM needs to remove two redundant image components from the recorded interferograms: the zero-order diffraction image and the conjugate specimen image. As illustrated below, these redundant image components can be reliably removed by taking a plurality of interferograms at different positions.

Figure 1:
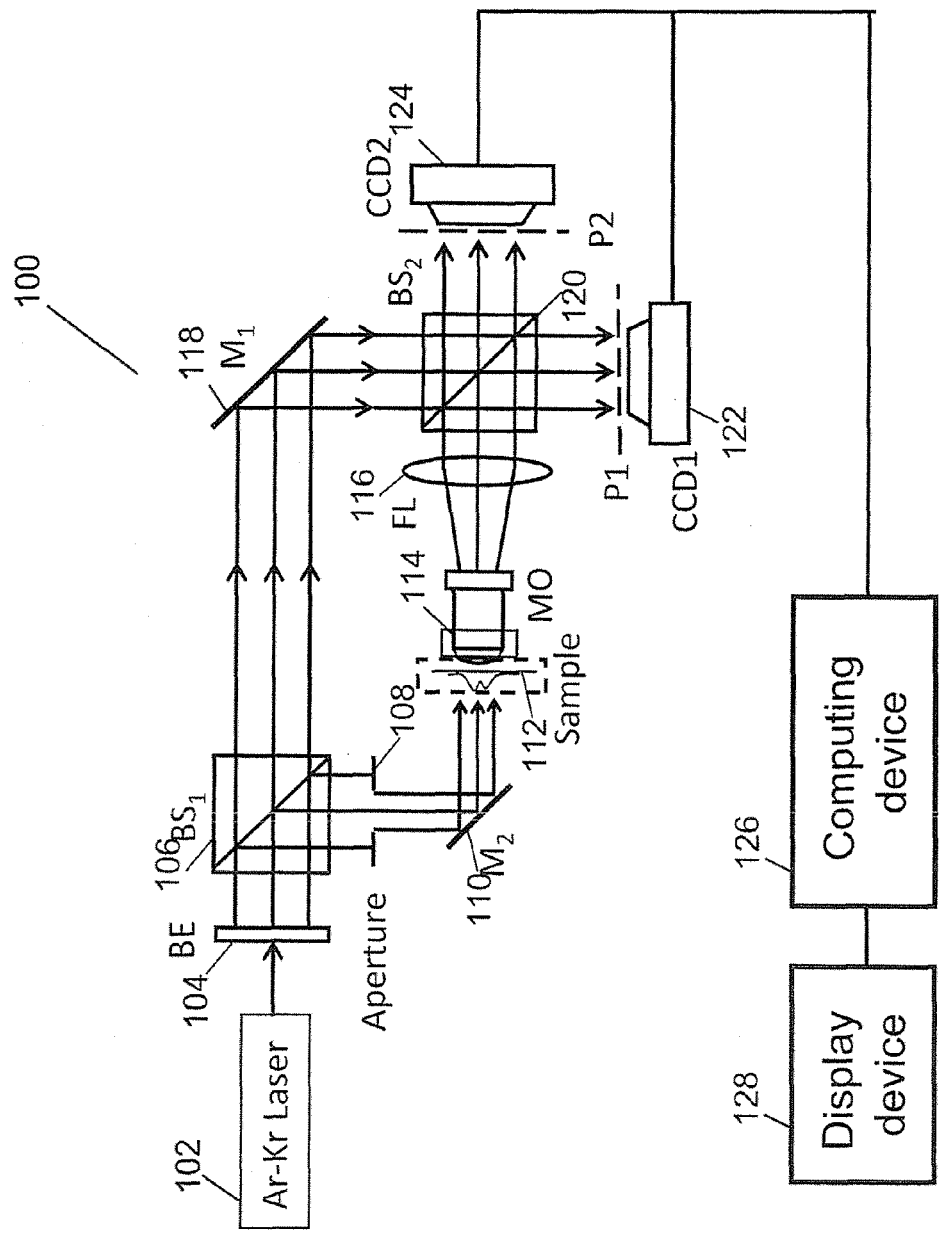
FIG. 1 illustrates in-line dual-plane digital holography microscopy (ID-DHM) in accordance with some embodiments of the present invention.

FIG. 1 shows an in-line dual-plane DHM (ID-DHM) system in accordance with certain embodiments. The ID-DHM system 100 includes a coherent light source 102, a beam expander (BE) 104, two beam splitters ($BS_1$ and $BS_2$) 106, 120, an aperture 108, two mirrors ($M_1$ and $M_2$) 110, 118, an object area (also called a sample area) 112, a microscope objective (MO) 114, a field lens (FL) 116, a first imaging device 122, a second imaging device 124, a computing device 126, and a display device 128.

A coherent light source 102 emits linearly polarized optical waves. Preferably, the emitted optical waves are collimated waves of monochromatic light. The coherent light source 102 can include a continuous-wave laser, in particular an Ar—Kr laser ($\lambda$=488 nm), and a diode laser. The optical waves from the light source 102 are subsequently spatially filtered and collimated using a beam expander (BE) 104. The BE 104 spatially filters the coherent optical waves in order to provide a clean, expanded Gaussian profile and to remove random fluctuations in the intensity profile of the optical waves, thereby improving the resolution of the imaging system 100. In addition to the BE 104, a dedicated spatial filter can also be used. A dedicated spatial filter can include diffractive optical elements, beam shapers, and fiber illuminators.

The collimated optical waves from the BE 104 are subsequently split into two sets of optical waves using a beam splitter ($BS_1$) 106. The first set of waves, which is reflected by a first mirror (M1) 118, serves as the reference waves. The second set of waves propagates through an aperture 108 and is reflected by a second mirror ($M_2$) 110 to be directed to the object area 112. The object area 112 has thereon the specimen to be examined. The specimen can be an amplitude object, a phase object, or an object with both an amplitude structure and a phase structure.

The specimen can modify the light rays in the second set of waves based on its optical characteristics.

The second set of waves passing through the object area 112 is magnified by a microscope objective (MO) 114 and collimited by a field lens (FL) 116, thereby becoming the object waves. The object waves and the reference waves are subsequently combined and interfered using an optical element, which can be a second beam splitter (BS2) 120.

In a preferred embodiment, the interfered optical waves are recorded at two image planes using imaging devices 122, 124, one imaging device 122 located at the first recording plane and another imaging device 124 located at the second recording plane. The imaging devices 122, 124 can include an image sensor, such as a charge-coupled device (CCD) sensor and a complementary metal-oxide-semiconductor (CMOS) sensor, and the recorded images are called an interference pattern, an interferogram, or a hologram. The first recording plane P1 is located at a distance z from the image plane and the second recording plane P2 is located at z+Δz from the image plane. The recorded interferogram at the first recording plane is denoted as $I_1$ and the recorded interferogram at the second recording plane is denoted as $I_2$.

In another embodiment, the two interferograms are recorded sequentially using a single imaging device: (1) place the imaging device at a first recording plane, (2) record a first interferogram at the first recording plane at a first time instance, (3) move the imaging device to a second recording plane, and (4) record a second interferogram at the second recording plane at a second time instance.

The recorded interferograms are processed to reconstruct specimen information using a computing device 126. The specimen information can include an amplitude structure of the specimen, a phase structure of the specimen, or a combination of both. The two recorded interferograms, $I_1$ and $I_2$, can be expressed as follows:

$$I_1(x_1, y_1; z) = |1 + u_1(x_1, y_1; z)|^2 = \\ 1 + |u_1(x_1, y_1; z)|^2 + u_1(x_1, y_1; z) + u_1*(x_1, y_1; z) \quad (1)$$

$$I_2(x_2, y_2; z + \Delta z) = |1 + u_2(x_2, y_2; z + \Delta z)|^2 = \\ 1 + |u_2(x_2, y_2; z + \Delta z)|^2 + u_2(x_2, y_2; z + \Delta z) + u_2*(x_2, y_2; z + \Delta z) \quad (2)$$

where the reference waves are assumed to be on-axis plane waves of unit amplitude without loss of generality, and $u_1(x_1,y_1;z)$ and $u_2(x_2,y_2;z+\Delta z)$ indicate the diffraction pattern of the specimen object function $u_0(x_0,y_0;0)$ at two image planes. The first two terms of Eq. (1) and Eq. (2), $1+|u_1(x_1,y_1;z)|^2$ and $1+|u_2(x_2,y_2;z+\Delta z)|^2$, respectively, correspond to the zero-order diffraction image of the respective interferogram; the third term of Eq. (1) and Eq. (2), $u_1(x_1,y_1;z)$ and $u_2(x_2,y_2;z+\Delta z)$, respectively, correspond to the specimen image of the respective interferogram; and the last term of Eq. (1) and Eq. (2), $u_1*(x_1,y_1;z)$ and $u_2*(x_2,y_2;z+\Delta z)$, respectively, correspond to the conjugate specimen image of the respective interferogram.

The goal of DHM is to recover $u_0(x_0,y_0;0)$ from $I_1$ and $I_2$. The diffraction patterns $u_1(x_1,y_1;z)$ and $u_2(x_2,y_2;z+\Delta z)$ can be expressed in terms of the specimen's diffraction pattern $u_0(x_0,y_0;0)$ using the Rayleigh-Sommerfeld diffraction formula as follows:

$$u_i(x_i, y_i; z_i) = \\ P\{u_0(x_0, y_0; 0); z_i\} = -\frac{1}{2\pi} \int\int u_0(x_0, y_0; 0) \frac{\partial}{\partial z_i}\left[\frac{\exp[jkr_i]}{r_i}\right] dx_0 dy_0 \quad (3)$$

where i=1, 2, $z_1=z$, $z_2=z+\Delta z$, $r_i=[(x_i-x_0)^2+(y_i-y_0)^2+z_i^2]^{1/2}$, $k=2\pi/\lambda$ and the operator $P\{\bullet; z\}$ stands for a free space propagation operator indicating a propagation of optical waves in free space over a distance z. Therefore, to recover the specimen image of the illuminated specimen $u_0(x_0,y_0;0)$, either $u_1(x_1,y_1;z)$ or $u_2(x_2,y_2;z+\Delta z)$ should be recovered from the recorded interferograms $I_2$ and $I_2$.

The two interferograms, $I_1$ and $I_2$, can be processed jointly to recover $u_1(x_1,y_1;z)$ or $u_2(x_2,y_2;z+\Delta z)$. As a first step, the zero-order diffraction image in each interferogram, $1+|u_1(x_1, y_1;z)|^2$ and $1+|u_2(x_2,y_2;z+\Delta z)|^2$, respectively, is removed. Apparently, the zero-order diffraction image is constant across the image. Therefore, the zero-order diffraction image can be removed by subtracting the average intensity of the respective interferogram as illustrated in Eq. (4) and Eq. (5). An interferogram with a zero average intensity, called a zero-mean interferogram, is denoted as l.

$$l_1(x_1,y_1;z)=I_1(x_1,y_1;z)-I_{1,avg}\approx u_1(x_1,y_1;z)+u_1*(x_1,y_1;z) \quad (4)$$

$$l_2(x_2,y_2;z+\Delta z)=I_2(x_2,y_2;z+\Delta z)-I_{2,avg}\approx u_2(x_2,y_2;z+\Delta z)+u_2*(x_2,y_2;z+\Delta z) \quad (5)$$ where $$I_{i,avg} = \frac{1}{NM}\sum_{k=0}^{N-1}\sum_{m=0}^{M-1} I_i(k\Delta x, m\Delta y; z_i),$$

Δx and Δy are the pixel sizes of the imaging device, and N and M are the number of pixels along x and y directions, respectively.

As a second step, the conjugate image $u_1*(x_1, y_1; z)$ of the first zero-mean interferogram $l_1$ is removed using information from the second zero-mean interferogram $l_2$. The conjugate image $u_1*(x_1, y_1; z)$ of the first zero-mean interferogram $l_1$ and the conjugate image $u_2*(x_2, y_2; z+\Delta z)$ of the second zero-mean interferogram $l_2$ are related through a free-space propagation operator:

$$u_1*(x_1,y_1;z)=P\{u_2*(x_2,y_2;z+\Delta z);\Delta z\} \quad (6)$$

Let $\delta l(x_1, y_1)$ be the difference between the first zero-mean interferogram $l_1$ and the propagation-operated second zero-mean interferogram $l_2$. Then the following relationship holds:

$$\delta l(x_1, y_1) = l_1(x_1, y_1; z) - P\{l_2(x_x, y_2; z+\Delta z); \Delta z\} \quad (7)$$
$$= u_1(x_1, y_1; z) + u_1*(x_1, y_1; z) - P\{u_2(x_2, y_2; z+\Delta z); \Delta z\} - \\ P\{u_2*(x_2, y_2; z+\Delta z); \Delta z\}$$
$$= u_1(x_1, y_1; z) - P\{u_2(x_2, y_2; z+\Delta z); \Delta z\}$$
$$= u_1(x_1, y_1; z) - P\{u_1(x_1, y_1; z); 2\Delta z\} \quad (8)$$

Eq. (8) holds because of the linearity of the propagation operator, i.e., $$u_2(x_2,y_2;z+\Delta z)=P\{u_1(x_i,y_1;z);\Delta z\}.$$

Given these relationships, the object function $u_1(x_1, y_1; z)$ can be extracted in the Fourier domain:

$$\delta I(f_x,f_y)=U_1(f_x,f_y;z)[1-H(f_x,f_y;2\Delta z)] \quad (9)$$

where $H(f_x,f_y;2\Delta z)$ is the transfer function of free space propagation over a distance 2Δz; and $U_1(f_x,f_y; z)$ is the Fourier transform of the diffraction pattern $u_1(x_1,y_1; z)$. $H(f_x,f_y;z_i)$ can be represented as follows:

$$H(f_x, f_y; z) = \exp\left[-i\frac{2\pi z_i}{\lambda}(1 - \lambda^2 f_x^2 - \lambda^2 f_y^2)^{1/2}\right] \quad (10)$$

where λ is the wavelength of the waves.

Eq. (9) shows that $U_1(f_x,f_y;z)$ is related to $\delta I(f_x,f_y)$ and the transfer function $H(f_x,f_y;2\Delta z)$. The benefit of this relationship is that both $\delta I(f_x,f_y)$ and $H(f_x,f_y;2\Delta z)$ can be numerically constructed: $\delta I(f_x,f_y)$ can be computed directly from the recorded interferograms as shown in Eq. (8); $H(f_x,f_y;2\Delta z)$ can be computed using Eq. (10). Therefore, the diffraction pattern at the first image plane can be calculated as follows:

$$u_1(x_1, y_1; z) = \mathfrak{J}^{-1}\left\{\frac{\delta I(f_x, f_y)}{1 - H(f_x, f_y; 2\Delta z)}\right\} \quad (11)$$

where $\mathfrak{J}^{-1}\{\bullet\}$ stands for the inverse Fourier transform. The object function $u_0(x_0,y_0;0)$ can be computed from the diffraction pattern $u_1(x_1,y_1;z)$ at the first image plane by taking the inverse Fresnel transformation over a distance of '−z'. The reconstructed object function can then be displayed on a display device 128, which includes a liquid crystal display (LCD), a cathode ray tube (CRT) display, and a light-emitting diode (LED) display. Therefore, the optical system of FIG. 1 can recover the objection function of the specimen from the two interferograms recorded at two image planes.

Figure 2:
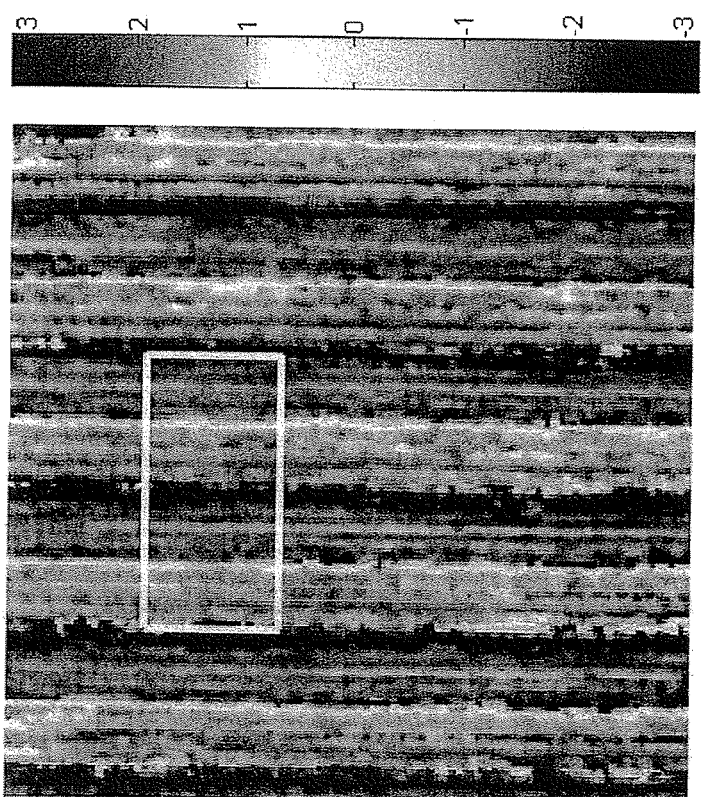
FIG. 2 shows an image of a binary phase grating reconstructed using an embodiment of ID-DHM shown in FIG. 1.

FIG. 2 shows an image of a binary phase grating (i.e., a phase object) reconstructed using the optical system 100 of FIG. 1. The image depicts the phase profile of the optical field transmitted through the grating where the two different regions correspond to phase shifts introduced by the binary phase grating. The bar on the right shows the phase value of the phase grating in radians. For this reconstruction, the interferograms are recorded by using an imaging device called a SPOT Insight™ 2 MP Firewire CCD with square pixels of size 7.4 µm. The diffracted light from the phase grating is magnified by a 50×MO 114 (Nikon™), and the two interferograms are recorded at distances z=80 mm and z+Δz=(80+0.1) mm from the image plane.

Figure 3:
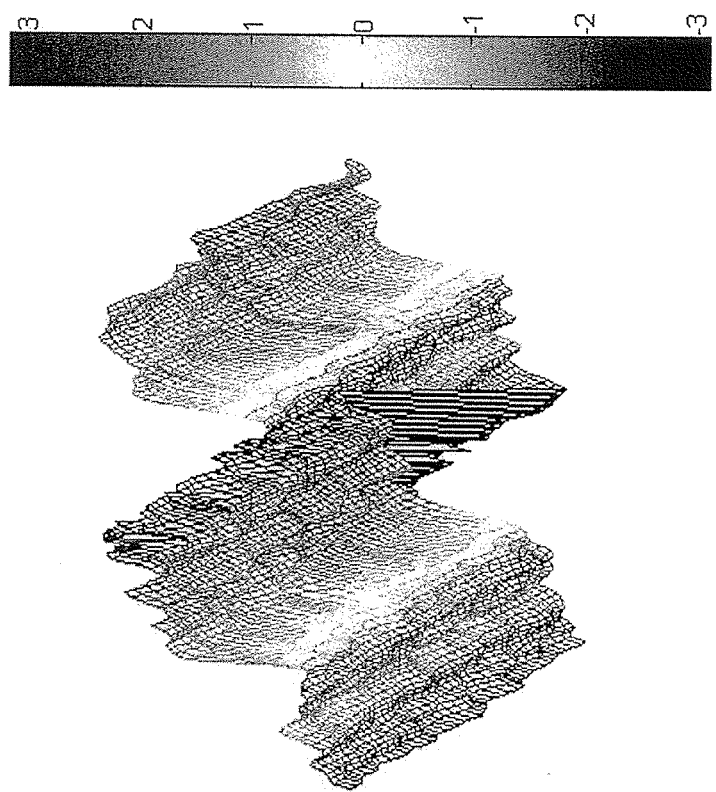
FIG. 3 illustrates a binary phase grating reconstructed using an embodiment of ID-DHM shown in FIG. 1.

FIG. 3 shows the 3D perspective phase profile of the region indicated in FIG. 2. FIG. 3 clearly shows the peaks and valleys of the diffraction grating. The fluctuations in the phase values can be attributed to the spatial nonuniformities of the grating surface and impurities in the glass. FIGS. 2 and 3 demonstrate that the disclosed embodiment of ID-DHM can reliably reconstruct phase information of specimens.

Figure 4:
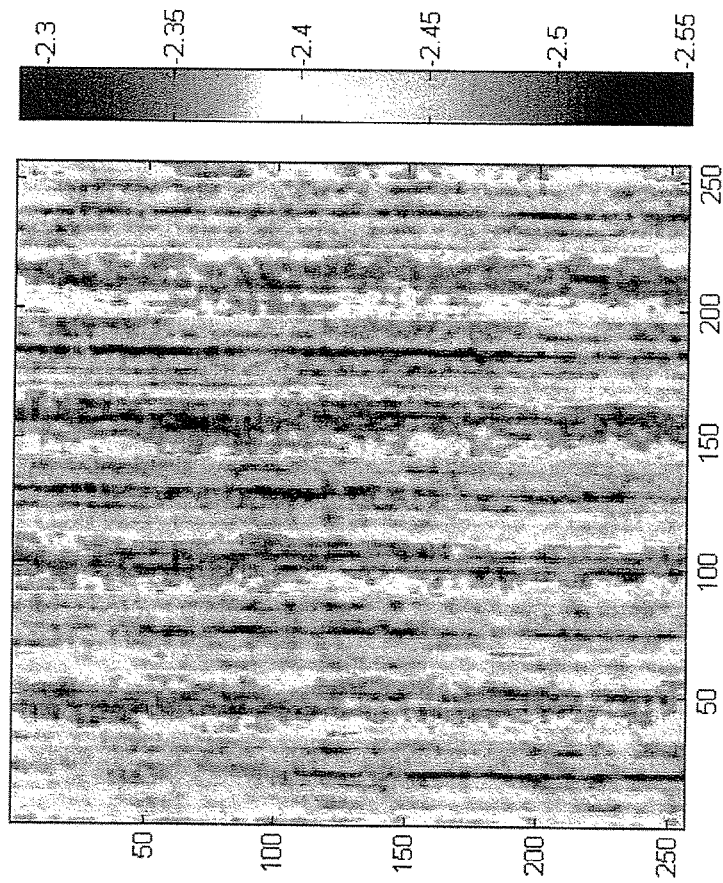
FIG. 4 illustrates a binary phase grating reconstructed using Zhang's optical system.

As a comparison, FIG. 4 shows an image of the same binary phase grating reconstructed using the optical system of Zhang et al., entitled "Reconstruction of in-line digital holograms from two intensity measurements." The reconstruction in FIG. 4 shows that the phase of the diffraction grating varies only from −2.55 to −2.3 radians. In principle, the phase variation in a proper diffraction grating is always greater than the phase variations illustrated by the reconstruction. Therefore, the phase image reconstructed using Zhang's optical system is inaccurate. The origin of such inaccuracy may step from (1) Zhang's assumption that the magnitude of object waves is significantly low compared to that of the reference waves and (2) the logarithmic operations performed on the recorded interferograms.

FIGS. 5A-5B show an image and a profile of a portion of the USAF resolution chart (i.e., an amplitude object) reconstructed using the optical system 100 of FIG. 1. The interferograms are recorded using a 20×MO 114. The finest structure in the USAF resolution chart is the sixth element of Group 7. The width of the sixth element in Group 7 is 4.4 µm. The reconstructed image 140 shows that all the elements of Groups 6 and 7 are clearly resolved. The profile 142 in FIG. 5B shows the pixel intensity along the direction of the yellow arrow indicated on the reconstructed image 140. The profile 142 shows that the contrast of the reconstructed amplitude image is sufficiently high. The quality of the reconstructed image 140 is robust to the choice of distance z from the reference plane 126. It is possible to obtain qualitatively similar results even when interferograms are recorded at the reference plane, i.e., z=0.

For comparison, FIGS. 6A-6B show an image and a profile of the same USAF resolution chart reconstructed using the optical system of Zhang et al., entitled "Reconstruction of in-line digital interferograms from two intensity measurements." Although Zhang's optical system is capable of reconstructing the USAF resolution chart, the contrast in the reconstructed image 150 is poor. The profile 152 in FIG. 6B shows the pixel intensity along the direction of the yellow arrow indicated on the reconstructed image 150. The profile 152 shows that the contrast of the reconstructed image 150 is quite low (varying between intensity of 4 and 6), rendering the result 150 not as useful as the image reconstructed using embodiments of ID-DHM.

Common Path in-Line Dual Plane DHM (CID-DHM)

In certain embodiments, in-line dual-plane DHM can be incorporated in a common-path DHM system. Existing common-path DHM systems are intricate optical systems that are difficult to control and use because they require (1) taking at least four interferograms, (2) mechanically translating a grating at a resolution of about 1 µm, and/or (3) precisely aligning the optical elements. These systems are also not suited to imaging dynamic processes because multiple interferograms must be captured sequentially with different grating settings. Common-path in-line dual-plane DHM (CID-DHM) addresses these issues. CID-DHM is capable of capturing interferograms at a single time instance without changing phase grating settings.

At a high level, CID-DHM uses a coherent light source to illuminate a specimen that is located in an optical path between the light source and an image plane. CID-DHM is configured to illuminate the specimen along the axis normal to the image plane. The optical waves passing through the specimen include two components: (1) directly transmitted waves and (2) diffracted waves. Some optical waves propagate through the specimen unscattered. These waves are called the directly transmitted waves. The directly transmitted waves are plane waves whose amplitude and phase do not vary across the plane. On the other hand, other optical waves do become affected by the phase structure of the specimen. These waves are called the diffracted waves. The diffracted waves form plane waves whose amplitude and phase do vary across the image plane.

In contrast to ID-DHM, which interferes the optical waves passing through the specimen with separate reference waves, CID-DHM does not use separate reference waves. Instead, CID-DHM interferes the directly transmitted waves and the diffracted waves to extract the specimen information. In other words, in CID-DHM, the directly transmitted waves perform the function of the reference waves and the diffracted waves perform the function of the object waves.

The interferograms of CID-DHM include three image components: (1) a reference image formed from the directly transmitted waves, also called a zero-order diffraction beam, (2) a specimen image of the illuminated specimen formed from the diffracted waves, and (3) a conjugate specimen image of the illuminated specimen formed from the complex conjugate of the diffracted waves. The goal of CID-DHM is to recover the specimen image from interferograms. To recover the specimen image of the illuminated specimen from the interferograms, in-line DHM needs to remove two redundant image components from the recorded interferograms: the zero-order diffraction image and the conjugate specimen image. As illustrated below, these redundant image components can be reliably removed by taking a plurality of interferograms at different positions. In order to record interferograms with a substantial contrast, CID-DHM may use a phase modulator to introduce a fixed phase delay between the directly transmitted waves and the diffracted waves. CID-DHM eliminates common phase noise substantially by simultaneously recording the two interferograms. Therefore, CID-DHM is capable of maintaining sub-nanometer level of optical path length stability.

Figure 7:
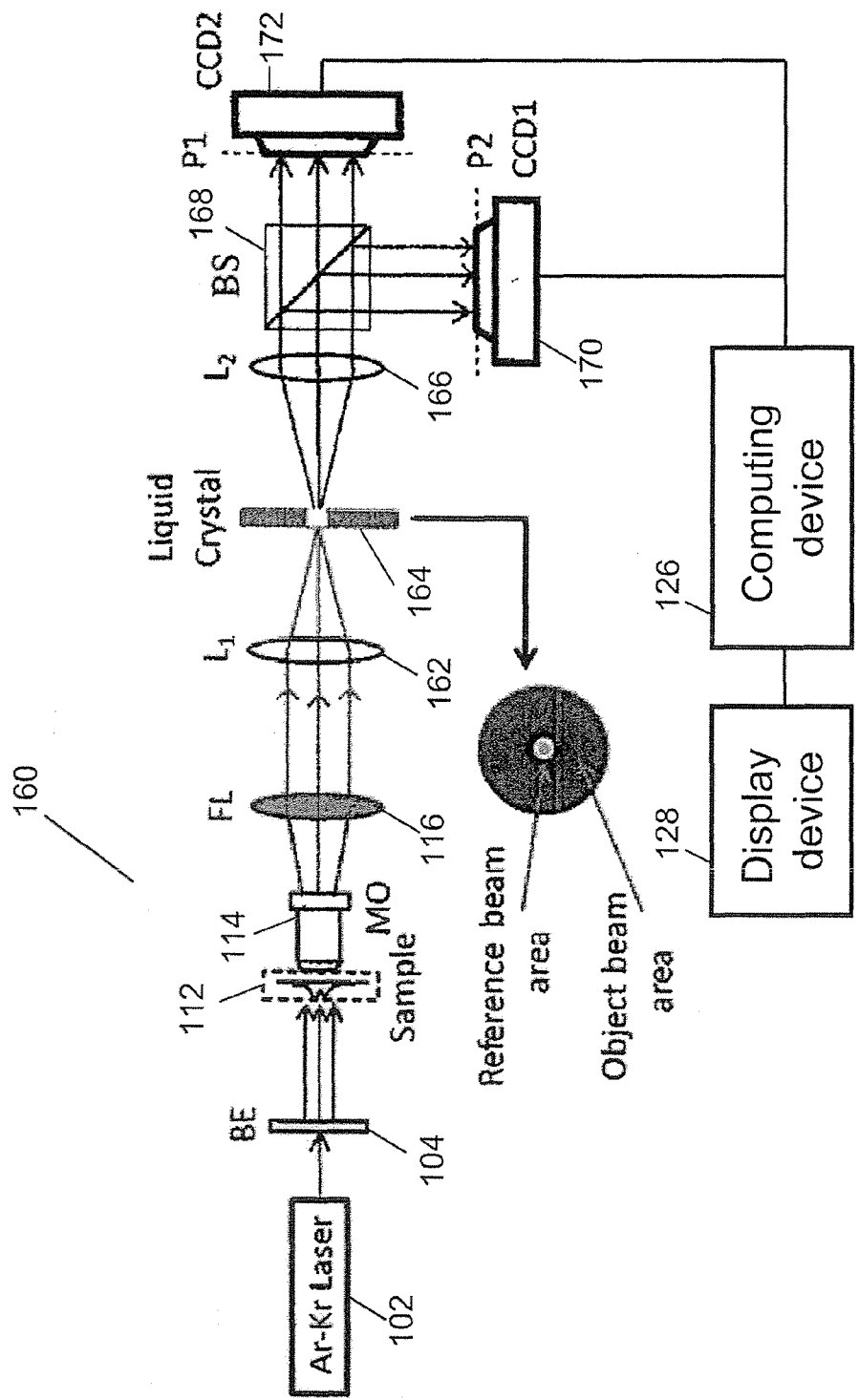
FIG. 7 illustrates common-path in-line dual-plane digital holography microscopy (CID-DHM) in accordance with some embodiments of the present invention.

FIG. 7 illustrates a CID-DHM optical system in accordance with certain embodiments. The CID-DHM system 160 includes a light source 102, a beam expander (BE) 104, an object area (also called a sample area) 112, a microscope objective (MO) 114, a field lens (FL) 116, lenses 162, 166, a phase modulator 164, a beam splitter (BS) 168, two imaging devices 170, 172, a computing device 126, and a display device 128.

A coherent light source 102 emits linearly polarized optical waves. Preferably, the emitted optical waves are collimated waves of monochromatic light. The coherent light source 102 can include a continuous-wave laser, in particular an Ar—Kr laser 102 ($\lambda$=488 nm), and a diode laser. The optical waves from the light source 102 are subsequently spatially filtered and collimated using a beam expander (BE) 104. The BE 104 spatially filters the coherent optical waves in order to provide a clean, expanded Gaussian profile and to remove random fluctuations in the intensity profile of the optical waves, thereby improving the resolution of the imaging system 160. In addition to the BE 104, a dedicated spatial filter can also be used. A dedicated spatial filter can include diffractive optical elements, beam shapers, and fiber illuminators.

The collimated optical waves propagate through the object area 112, which has thereon the specimen to be analyzed. The specimen scatters the optical waves based on its optical characteristics and generates directly transmitted waves and diffracted waves, as discussed earlier. The directly transmitted waves and the diffracted waves are subsequently magnified by a microscope objective (MO) 114, and the magnified waves are collimated using the field lens (FL) 116.

The collimated waves are then passed through the first lens $L_1$ 162. The first lens $L_1$ 162 is a Fourier lens: the directly transmitted waves converge on the optical axis of the first lens $L_1$ 162, generating the zero-order Fourier component of the specimen; the diffracted waves converges at different positions around the optical axis of the first lens $L_1$ 162, generating the higher-order Fourier components of the specimen. The plane at which the collimated waves converge is called the Fourier plane.

The convergent waves are phase modulated at the Fourier plane using a phase modulator 164. In particular, the phase modulator 164 introduces a predetermined amount of phase delay between the directly transmitted waves and the diffracted waves to record an interference pattern. In certain embodiments, the phase modulator 164 is constructed using a liquid crystal, and the liquid crystal phase modulator 164 is configured to introduce a phase delay substantially close to $$\frac{\pi}{2}$$

to the diffracted waves while not introducing any phase delay to the directly transmitted waves. In another embodiment, the liquid crystal phase modulator 164 is configured to introduce a phase delay substantially close to $$\frac{3\pi}{2}$$

to the directly transmitted waves while not introducing any phase delay to the diffracted waves.

The optical waves through the phase modulator 164 propagates through a second lens $L_2$ 166, which is placed at $L_2$'s focal distance from the Fourier plane. The second lens $L_2$ 166 is configured to perform the inverse Fourier transform of the phase-modulated waves. The second lens $L_2$ 166 planarizes the directly transmitted waves and diffracted waves and superposes them coherently. This way, the directly transmitted waves, i.e., the zero-order Fourier component of the specimen, act as reference waves that are interfered with the diffracted waves, i.e., the higher-order Fourier components of the specimen.

The interfered waves are recorded at two recording planes. In a preferred embodiment, the two interferograms are recorded simultaneously using a beam splitter (BS) 168 and two imaging devices 170, 172, one located at the first recording plane at a distance z from the image plane and another located at the second recording plane at a distance z+$\Delta$z from the image plane. In another embodiment, the two interferograms are recorded sequentially: (1) record the first interferogram at the first recording plane at a first time instance, (2) move the CCD to the second recording plane, and (3) record the second interferogram at the second recording plane at a second time instance. The two interferograms are processed using a computing device 126 to reconstruct the specimen information. The method of reconstructing the specimen information from the two interferograms is identical to that of ID-DHM.

Figure 9:
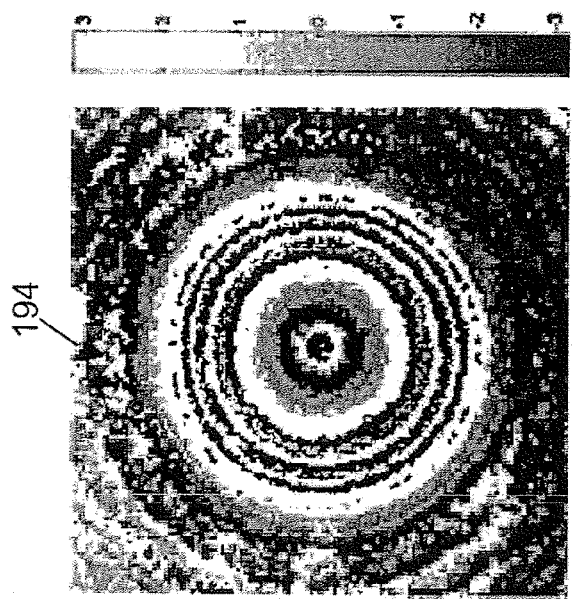
FIG. 9 illustrates the phase information of polystyrene beads reconstructed using an embodiment of CID-DHM shown in FIG. 7.

FIGS. 8 and 9 illustrate an experimental validation of imaging a polystyrene bead using the embodiment of CID-DHM shown in FIG. 7. Two images 190, 192 in FIGS. 8A-8B are the interferograms recorded using the two imaging devices 170, 172, and the image 194 in FIG. 9 is the phase profile of the polystyrene bead reconstructed from the interferograms 190, 192. The vertical gray scale of FIG. 9 shows the phase values in radians. The illustrated phase profile 194 is phase-wrapped—one skilled in the art can use known phase unwrapping techniques to reconstruct the bead's shape and size information from the wrapped phase profile.

Figure 11:
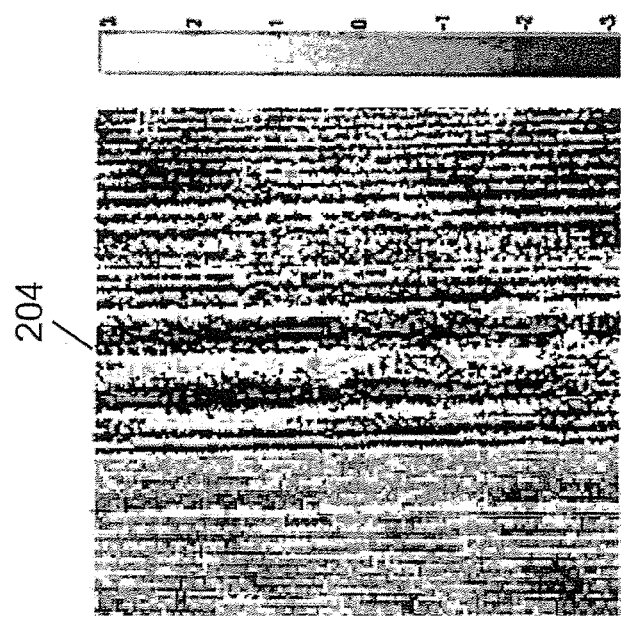
FIG. 11 illustrates the phase information of fibers reconstructed using an embodiment of CID-DHM shown in FIG. 7.

Similarly, FIGS. 10 and 11 illustrate an experimental validation of imaging fibers using the embodiment of CID-DHM shown in FIG. 7. Two images 200, 202 in FIGS. 10A-10B are the interferograms recorded using the two imaging devices 170, 172, and the image 204 in FIG. 11 is the phase profile of the fibers reconstructed from the interferograms 200, 202. The vertical gray scale of FIG. 11 shows the phase values in radians. In FIGS. 8 and 10, the two interferograms were recorded at planes that are 80 cms and (80+0.01) cms away from the image plane.

CID-DHM can be useful in many biological applications that require measurements of quantitative phase information of fast dynamic processes. Furthermore, CID can be useful in the area of investigating three-dimensional particle distribution and motions such as observing aerosol particles undergoing Brownian motion. Such processes demand both high spatial and temporal resolutions from the imaging system, which can be easily resolved with CID-DHM.

Common Path in-Line Multi-Modal DHM (CIM-DHM)

DHM can be combined with fluorescence microscopy to acquire specimen information in multiple modalities. Fluorescence microscopy is a well established and widely used technique within the field of cell biology and has permitted, in particular with the utilization of specific fluorescent cellular probes, the observation of dynamic processes in living cells ranging from vesicles fusion to the concentration changes of specific intracellular signaling molecules. While quantitative phase microscopy techniques primarily reveal morphological information, fluorescence microscopy can reveal functional information of live cells. Thus, comprehensive information about any biological specimens can be obtained by combining the optical imaging modalities of quantitative phase microscopy (based on digital holographic microscopy) and fluorescence microscopy. Fluorescence microscopy uses intrinsic or extrinsic chromophores to reveal specimen's hidden details that cannot otherwise be observed. In fluorescence microscopy, a specimen is illuminated with optical waves, which causes fluorescence in the specimen. The light emitted by fluorescence, which is at a different wavelength than the illumination, is then detected and analyzed.

Multimodal microscopy, such as multimodal DHM, combines phase microscopy and fluorescence microscopy to image both phase structure of the specimen as well as hidden details that cannot otherwise be observed. Existing multimodal DHM techniques capture an interferogram for phase information and fluorescence image for fluorescence information in a sequential manner. Therefore, the applications of existing multimodal DHM techniques have been limited to observations of static or slowly varying phenomena.

Figure 12:
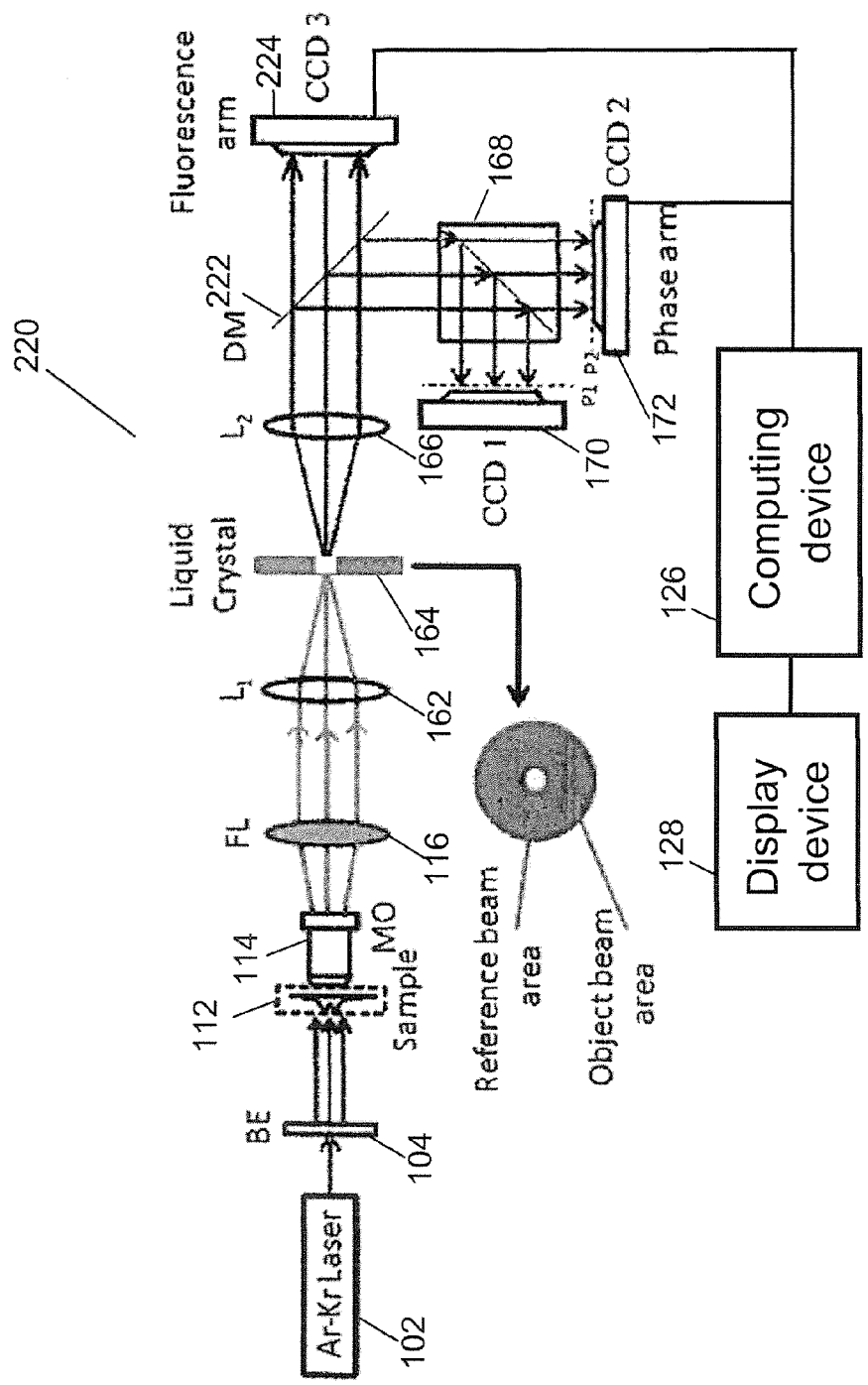
FIG. 12 illustrates common-path in-line multi-modal digital holography microscopy (CIM-DHM) in accordance with some embodiments of the present invention.

These issues are addressed by common-path in-line multimodal DHM (CIM-DHM). CIM-DHM can substantially simultaneously record one set of interferograms for phase information and a fluorescence image for fluorescence information, using a dichroic mirror and three imaging devices. FIG. 12 shows an optical setup of CIM-DHM in accordance with certain embodiments. The optical setup 220 is based on an embodiment of CID-DHM illustrated in FIG. 7, but the optical setup 220 further includes a dichroic mirror (DM) 222 and a third imaging device 224.

As in CID-DHM, the object area 112 is illuminated with coherent optical waves from the light source 102. The optical waves passing through the object area 112 include three components: (1) directly transmitted waves, (2) diffracted waves, and (3) fluorescence waves encoding the fluorescence information of the specimen. The directly transmitted waves and the diffracted waves have the same wavelength as that of the coherent optical waves from the light source 102, whereas the fluorescence waves have different wavelengths. These components are Fourier transformed using the first Fourier lens 162. Then a phase delay is introduced between the directly transmitted waves and the diffracted waves using a liquid crystal phase modulator 164. Subsequently, the directly transmitted waves, diffracted waves, and the fluorescence waves are inversely Fourier transformed using the second Fourier lens 166.

The dichroic mirror (DM) 222 is configured to (1) receive optical waves passing through the liquid crystal phase modulator 164, (2) reflect optical waves with the substantially identical wavelength as the coherent optical waves from the light source 102, and (3) transmit (or let through) other wavelengths with insubstantial attenuation (i.e., the transmission coefficient of the DM 222 for other wavelengths is high). In the embodiment illustrated in FIG. 12, the DM 222 (1) receives the directly transmitted waves, the diffracted waves, and the fluorescence waves, (2) reflects the directly transmitted waves and the diffracted waves, and (3) transmits the fluorescence waves. In certain embodiments, the transmission coefficient of the DM 222 for other wavelengths is greater than 0.9. In other embodiments, the transmission coefficient of the DM 222 for other wavelengths is greater than 0.95.

The reflected waves, i.e., the directly transmitted waves and the diffracted waves, are subsequently interfered and the interfered waves are split into two sets using a beam splitter (BS) 168. Then each set of interfered waves are recorded at the phase arm, as indicated in the FIG. 12, using one of the two imaging devices 170, 172, as in CID-DHM. The recorded interferograms can be processed to reconstruct the phase information using techniques identical to CID-DHM. On the other hand, the transmitted waves, i.e., the fluorescence waves, are recorded at the fluorescence arm, as indicated in the FIG. 12, using a third imaging device 224. Therefore, the optical setup 220 illustrated in FIG. 12 enables capturing both phase information and fluorescence information at a single time instance, which is important for imaging dynamic processes.

Components of DHM

An imaging device used in illustrative embodiments can include a charge coupled device (CCD) sensor. The CCD sensor can be, for example, a two-dimensional array of detectors integrated into single, compact electronic chip. The CCD sensor converts photons to electrons using closely spaced metal-oxide-semiconductor (MOS) diodes and thereby generates a discrete electronic representation of a received optical image. A controller/processor reads the image representation from the CCD sensor pixel-by-pixel and organizes it into a digital array. The digital array can then be output to a memory or image store. The images can be displayed on an image display, such as a cathode ray tube or another type of electronic image display.

A phase modulator used in illustrative embodiments can include a liquid crystal phase modulator. Some of the greatest advantages of the liquid crystal phase modulator, in contrast to conventional phase modulators such as piezo-electric transducers (PZT), are a high light transparency and a high flexibility in forming electrodes of arbitrary shapes. These unique characteristics of the liquid crystal phase modulator can address many difficulties in the design of an interferometer. Furthermore, liquid-crystal devices can operate at a relatively low voltage (5-10 V) and do not exhibit hysteresis problem. These characteristics permit convenient and precise control of phase.

A liquid crystal phase modulator can be fabricated using a homogenous-type nematic liquid cell. Nematic liquid crystals (LC) include rodlike molecules which line up parallel to a preferred direction and hence are anisotropic. When a linearly polarized monochromatic light wave propagates through a homogeneously aligned LC cell, the anisotropy property of the liquid crystal adds a certain amount of phase to the transmitting beam.

A homogenous-type nematic liquid cell can be configured to introduce an arbitrary amount of phase modulation between the directly transmitted waves and the diffracted waves. A homogenous-type nematic liquid cell has a glass plate and input/output transparent electrodes deposited on both sides. In a preferred embodiment, a phase modulator is configured to modulate only the diffracted waves. To make a phase modulator that modulates only the diffracted waves, one can remove a small circular area of the transparent electrodes at the center, as illustrated in FIG. 7 and FIG. 12. The resulting liquid crystal cell has transparent electrodes across the entire plane except for the circular area at the center. Therefore, the optical waves hitting the transparent electrodes, which are the higher-order Fourier component of the illuminated specimen, are phase modulated while the optical waves hitting the central area, which are the zero-order Fourier component of the illuminated specimen, are not phase modulated. This way, the liquid crystal cell can introduce an arbitrary amount of phase modulation between the directly transmitted waves and the diffracted waves. In another embodiment, a phase modulator is configured to modulate only the directly transmitted waves. To make a phase modulator that modulates only the directly transmitted waves, one can remove the transparent electrodes except for a small circular area of the center, which is the inverse of the liquid crystal illustrated in FIG. 7 and FIG. 12.

Illustrative embodiments use a computing device to reconstruct specimen information from interferograms. A computing device can include any platforms capable of computations. A computing device can include a processor and a memory. Non-limiting examples can include computers, servers, set-top boxes or set-top units, netbooks, laptops, smart phones, and any other audio/visual equipment with computation capabilities. The computing device can have a memory such as a computer readable medium, flash memory, a magnetic disk drive, an optical drive, a programmable read-only memory (PROM), and/or a read-only memory (ROM). The computing device can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The computing device can also provide a variety of user interfaces such as a keyboard, a touch screen, a trackball, a touch pad, and/or a mouse. The computing device may also include speakers and a display device in some embodiments.

The method or process of reconstructing specimen information from interferograms can be implemented in software, which is stored in memory. In some embodiments, the software is implemented a high level procedural or an object-orientated language such as C, C++, C#, Java, or Perl. The software may also be implemented in assembly language if desired. The language can be a compiled or an interpreted language. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

The method or process of reconstructing specimen information from interferograms can be implemented in hardware using an application specific integrated circuit (ASIC), programmable logic array (PLA), field programmable gate array (FPGA), or any other integrated circuit.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow.

What is claimed is:

1. An in-line digital holographic microscopy system for recording phase objects, comprising:

a light source configured to emit coherent optical waves;

a first beam splitter configured to split the coherent optical waves into object waves and reference waves;

an object area configured to accommodate the phase object, wherein the object area is configured to be illuminated by the object waves;

a second beam splitter configured to combine the object waves and the reference waves along a common optical pathway to generate interfered optical waves, wherein there is no angle between the object waves and the reference waves downstream of the second beam splitter; and first and second imaging devices configured to record the interfered optical waves at first and second recording planes, the first recording plane positioned at a distance z from an image plane and the second recording plane positioned at a distance $z+\Delta z$ from the image plane, to generate a first interferogram and a second interferogram.

2. The system of claim 1, further comprising a computing device configured to recover phase structure of the phase object using the first interferogram and the second interferogram.

3. The system of claim 2, wherein the computing device recovers the phase structure of the phase object by computing a first zero-mean interferogram from the first interferogram and a second zero-mean interferogram from the second interferogram and by using an operator that relates the first zero-mean interferogram and the second zero-mean interferogram.

4. The system of claim 1, wherein the first and second imaging devices include a charge coupled device (CCD) sensor, and further wherein the light source includes a laser.

5. The system of claim 1, wherein the second beam splitter is further configured to provide the interfered optical waves in a first set of interfered optical waves and a second set of interfered optical waves, wherein the first set of interfered optical waves is recorded using one of the first and second imaging devices at the first recording plane and the second set of interfered optical waves is recorded using one of the first and second imaging devices at the second recording plane.

6. The system of claim 1, wherein the first and second imaging devices are configured to record the first interferogram and the second interferogram sequentially by recording the first interferogram at a first time instance at the first recording plane and subsequently recording the second interferogram at a second time instance at the second recording plane.

7. An in-line digital holographic microscopy system, comprising:

a light source configured to emit coherent optical waves;

an object area configured to accommodate a specimen, wherein the object area is configured to be illuminated by the coherent optical waves;

a first optical Fourier element configured to Fourier transform the coherent optical waves received from the object area, wherein the coherent optical waves received from the object area include directly transmitted waves and diffracted waves;

a liquid crystal phase modulator configured to introduce a phase delay between the directly transmitted waves and the diffracted waves along a common optical pathway;

a second optical Fourier element configured to receive the directly transmitted waves and the diffracted waves from the liquid crystal phase modulator and to inversely Fourier transform the directly transmitted waves and the diffracted waves, thereby providing interfered optical waves; and first and second imaging devices configured to record the interfered optical waves at first and second recording planes, the first recording plane positioned at a distance z from an image plane and the second recording plane positioned at a distance z+Δz from the image plane, to simultaneously generate a first interferogram and a second interferogram, respectively.

8. The system of claim 7, further comprising a computing device configured to compute specimen information using the first interferogram and the second interferogram.

9. The system of claim 8, wherein the computing device computes the specimen information by computing a first zero-mean interferogram from the first interferogram and a second zero-mean interferogram from the second interferogram and by using an operator that relates the first zero-mean interferogram and the second zero-mean interferogram.

10. The system of claim 7, wherein the liquid crystal phase modulator introduces the phase delay to the diffracted waves, the phase delay being substantially close to $$\frac{\pi}{2}.$$

11. The system of claim 7, wherein the liquid crystal phase modulator includes a nematic liquid crystal cell that has a glass plate and a transparent electrode, wherein a small circular area at a center of the transparent electrode is removed to introduce the phase delay only to the diffracted waves.

12. The system of claim 7, wherein the liquid crystal phase modulator introduces the phase delay to the directly transmitted waves.

13. The system of claim 7, further comprising a beam splitter configured to split the interfered optical waves into a first set of interfered optical waves and a second set of interfered optical waves.

14. The system of claim 7, wherein the first optical Fourier element and the second optical Fourier element include lenses, wherein the light source includes a laser, and wherein the first and second imaging devices include a charge coupled device (CCD) sensor.

15. The system of claim 7, further comprising a dichroic mirror configured to reflect the directly transmitted waves and the diffracted waves.

16. The system of claim 15, wherein the first and second imaging devices are further configured to record the optical waves transmitted from the dichroic mirror to generate a fluorescence image.

17. A method of analyzing phase information of a specimen, the method comprising:
generating coherent optical waves;
irradiating an object area with the coherent optical waves;
Fourier transforming the coherent optical waves received from the object area, wherein the coherent optical waves received from the object area include directly transmitted waves and diffracted waves;
introducing a phase delay between the directly transmitted waves and the diffracted waves;
upon introducing the phase delay, inversely Fourier transforming the directly transmitted waves and the diffracted waves; and
simultaneously recording the inversely Fourier transformed waves at two recording planes, the first recording plane positioned at a distance z from an image plane and the second recording plane positioned at a distance z+Δz from the image plane, to generate a first interferogram and a second interferogram.

18. The method of claim 17, wherein the step of Fourier transforming the coherent optical waves received from the object area includes receiving the coherent optical waves from the object area using a lens.

19. The method of claim 17, further comprising computing a phase information of the specimen using the first interferogram and the second interferogram.

20. The method of claim 19, wherein the step of computing the phase information of the specimen using the first interferogram and the second interferogram includes computing a first zero-mean interferogram from the first interferogram and a second zero-mean interferogram from the second interferogram and using an operator that relates the first zero-mean interferogram and the second zero-mean interferogram.

21. The method of claim 17, wherein the step of introducing the phase delay between the directly transmitted waves and the diffracted waves includes passing the directly transmitted waves through a cell with liquid crystal molecules.

22. An in-line multi-modal digital holographic microscopy system, comprising:
a light source configured to emit coherent optical waves;
an object area configured to accommodate a specimen, wherein the object area is configured to be illuminated by the coherent optical waves;
a first optical Fourier element configured to Fourier transform the coherent optical waves received from the object area, wherein the coherent optical waves received from the object area include directly transmitted waves, diffracted waves, and fluorescence waves;
a liquid crystal phase modulator configured to introduce a phase delay between the directly transmitted waves and the diffracted waves;
a second optical Fourier element configured to receive the directly transmitted waves, the diffracted waves, and the fluorescence waves, and to inversely Fourier transform the directly transmitted waves, the diffracted waves, and the fluorescence waves;
a dichroic mirror configured to reflect the directly transmitted waves and the diffracted waves, and further configured to transmit the fluorescence waves with insubstantial attenuation; and
a plurality of imaging devices configured to simultaneously record a plurality of interferograms of the directly transmitted waves and the diffracted waves at first and second recording planes, the first recording plane positioned at a distance z from an image plane and the second recording plane positioned at a distance z+Δz from the image plane, and to record the fluorescence waves at a third recording plane.

23. The system of claim 1, wherein Δz is about 0.1 mm.

* * * * *